Figure 1:
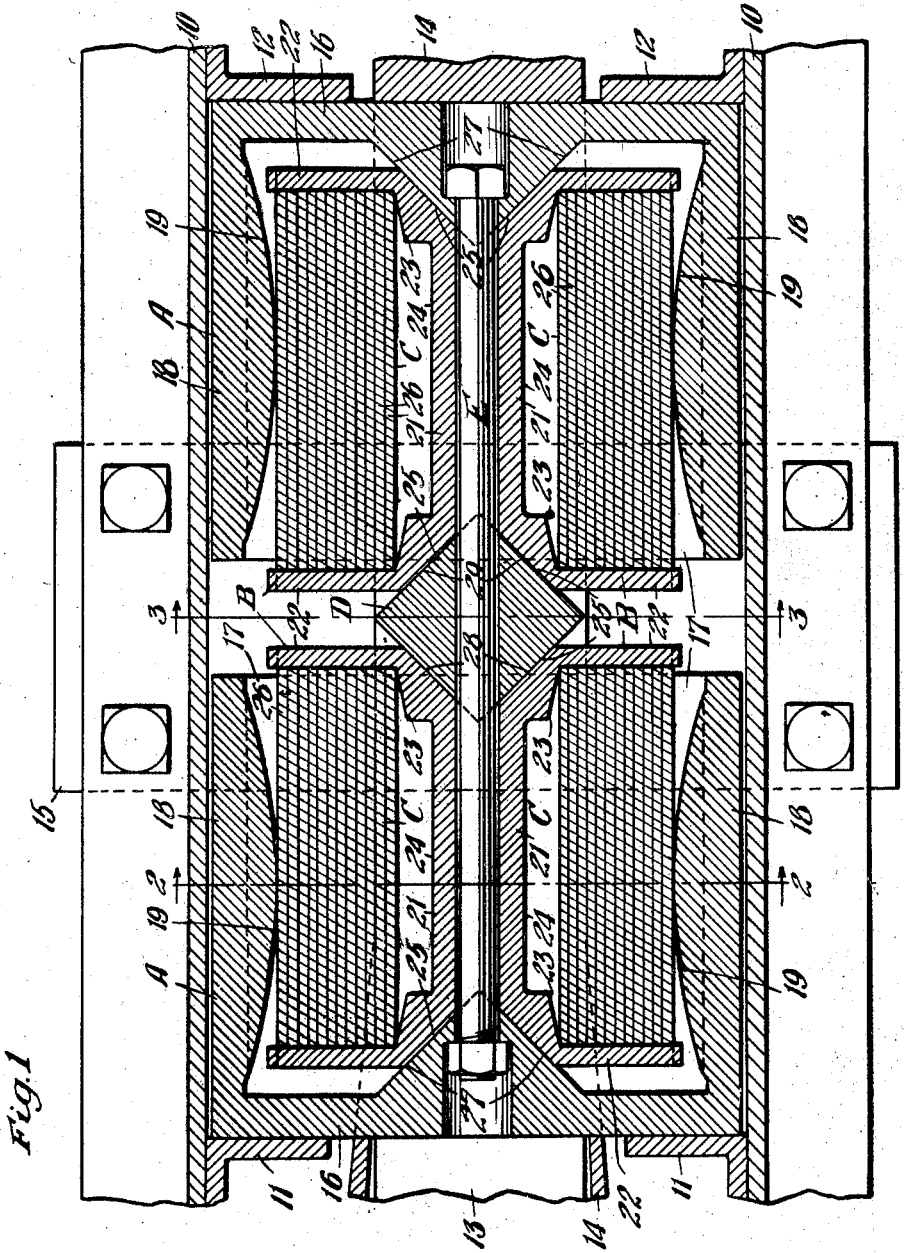

Sept. 29, 1925.  1,555,697
J. F. O'CONNOR
FRICTION SHOCK ABSORBING MECHANISM
Filed Nov. 8, 1922  2 Sheets-Sheet 1

Witness
Wm. Geiger

Inventor
John F. O'Connor
By Geo. J. Haight, Atty

Sept. 29, 1925.  
J. F. O'CONNOR  
1,555,697  
FRICTION SHOCK ABSORBING MECHANISM  
Filed Nov. 8, 1922  
2 Sheets-Sheet 2
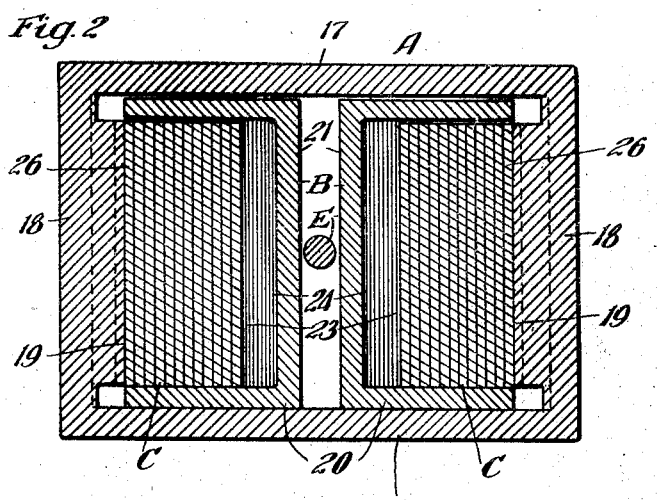
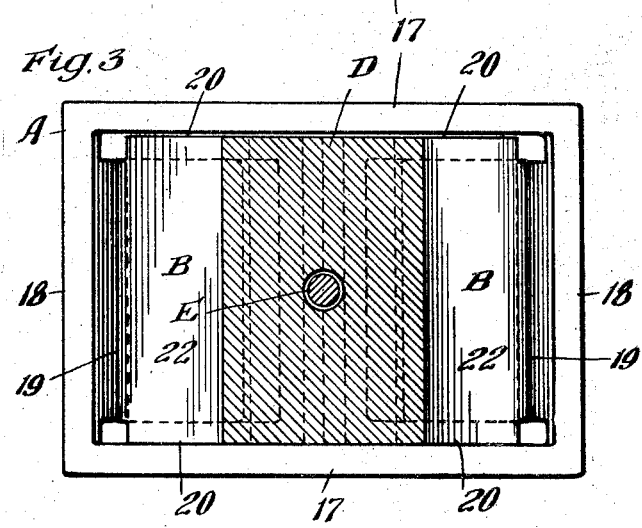
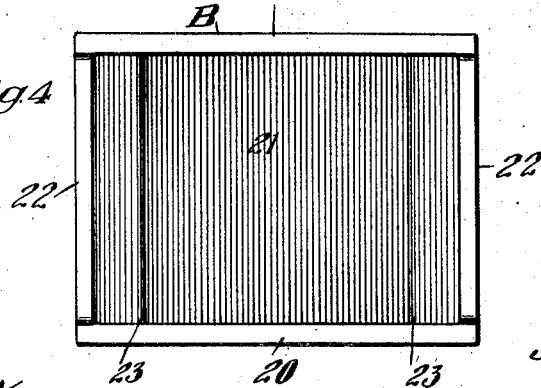
Witness  
Wm. Geiger
Inventor  
John F. O'Connor  
By Geo. I. Haight  
His Atty Patented Sept. 29, 1925.

1,555,697

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 8, 1922. Serial No. 599,622.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings, wherein are obtained high capacity, easy release, and unusually heavy column strength for absorbing the ultimate loads.

A specific object of the invention is to provide a friction mechanism of the character indicated wherein are employed groups of spring friction plates for developing not only a strong resistance to movement of certain cooperating slidable friction elements, but also for developing a certain amount of frictional resistance between each other as they are flexed.

Other objects of the invention will more clearly appear from the description and claims hereinafter following.

In the drawings forming a part of this specification, Figure 1 is a horizontal, longitudinal, sectional view of a portion of a railway draft rigging showing my improvements in connection therewith. Figures 2 and 3 are vertical, transverse, sectional views of the shock absorbing mechanism proper corresponding to the section lines 2—2 and 3—3 respectively of Figure 1. And Figure 4 is a side elevational view of one of the spring plate carriers.

In said drawings, 10—10 denote channel draft sills of a car underframe, to the inner faces of which are secured front stop lugs 11 and rear stop lugs 12. A portion of a draw-bar is indicated at 13, the same being operatively associated with a hooded cast yoke 14 within which is disposed the shock absorbing mechanism proper. The yoke and parts therewithin are supported in operative position by a detachable saddle plate 15.

The improved shock absorbing mechanism proper, as shown, comprises, broadly, two casings A—A; four spring plate carriers B—B; four groups of spring plates C—C; a central wedge block D; and a retainer bolt E.

Each of the casings A is of hollow rectangular form having a transverse end wall 16 functioning as a follower in conjunction with the respective stop lugs 11 or 12. Each casing is further provided with top and bottom parallel walls 17—17 and side walls 18—18. The side walls 18 are formed on their inner sides with inwardly extending convex bearings 19 serving as fulcrum bearings for the respective set of spring plates C disposed opposite thereto.

The carriers B are of like construction and each is of hollow elongated box-like form having top and bottom parallel flanges 20—20, longitudinally extending integral inner wall 21 and integral vertical transversely extending end walls 22—22. On their interiors, each carrier B is provided with concave corner shoulders 23—23 and below the latter is undercut or recessed deeper as indicated at 24. Each carrier B is also provided on its outer end corners with inclined wedge faces 25—25.

Within each carrier B is disposed a group of normally straight and flat spring steel friction plates individually designated as 26 and together constituting a group C, hereinbefore referred to. The innermost plate of each group bears upon the high points of the shoulders 23 and said plates obviously will be confined within each carrier B.

On the inner side of each end wall 16 of each casing A is a centrally located inwardly extending double-faced wedge 27, the latter cooperating with a corresponding end set of wedge faces 25 of the four carriers B.

The central wedge block D is substantially square in cross section as best indicated in Figure 1, thus providing one set of oppositely extending wedge faces 28—28 cooperating with the corresponding adjacent wedge faces of one pair of carriers B and with another set of oppositely extending wedge faces 29—29 cooperating with the corresponding wedge faces 25 of the other pair of carriers B.

The retainer bolt E is anchored at its ends in suitable sockets provided in the wedge sections 27 so that the over-all length of the mechanism may be maintained and also the spring plates maintained taut or, if desired, placed under an initial flex.

The opposed inner ends of the two casings A are normally separated a distance corresponding to the permissible compression stroke of the mechanism. The inner opposed ends of each longitudinally alined pair of carriers B are normally spaced a distance corresponding to half of the permissible compression stroke of the mechanism. The outer end of each carrier B is normally spaced from the opposed end wall of the corresponding carrier A a distance equal to one-quarter of the permissible compression stroke of the mechanism. With this arrangement, upon a full compression stroke, it is evident that the two casings A will abut each other and simultaneously therewith further column strength will be provided by each longitudinally alined pair of carriers B, inasmuch as they will be in contact with each other and at their ends will be in contact with the end walls of the casings A. During a compression stroke, the transversely alined pairs of carriers B will be laterally separated, due to the wedge actions at their ends, thus flexing the groups of plates about the respective convex bearing surfaces 19 of the casings A. Not only will friction be generated between the sets of wedge faces but further friction will be generated between the plates of the various groups as the latter are flexed inwardly of the respective carriers. In addition to the lateral movement of the carriers B, there will obviously be relative shifting thereof longitudinally within the respective casings A.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a pair of laterally opposed carriers; of a group of spring plates mounted on each carrier; a casing encircling the carriers and plates and providing fulcrum bearings between the ends of said plates for flexing the same; and wedge-friction elements at the ends of and co-acting with corresponding wedge sections of said carriers to separate the latter upon relative approach of said wedge elements.

2. In a friction shock absorbing mechanism, the combination with a pair of parallelly arranged carriers, each provided with a plurality of loosely assembled spring plates adapted for flexing with respect to the carrier; of means on each carrier engaging the opposite ends of the spring plates therein to retain the same in assembled relation; means providing opposed fulcrum bearings for the flexing of said plates; and relatively longitudinally movable wedge means cooperable with wedge sections on the ends of said carriers and adapted, upon relative longitudinal approach of said wedge means, to move said carriers transversely of said fulcrum bearing means.

3. In a friction shock absorbing mechanism, the combination with a pair of parallelly arranged carriers, each provided with a plurality of longitudinally disposed spring plates adapted for flexing with respect to the carrier; of means including a single casing, housing said carriers and plates, said casing having convex inner surfaces extending longitudinally of the mechanism and providing opposed fulcrum bearings for the flexing of said plates; and relatively longitudinally movable wedge means cooperable with wedge sections on the ends of said carriers and adapted, upon relative longitudinal approach of said wedge means, to move said carriers transversely and longitudinally of said fulcrum bearing means.

4. In a friction shock absorbing mechanism, the combination with a casing having interior laterally opposed longitudinally curved fulcrum bearing surfaces; of a pair of carriers disposed within said casing centrally thereof and having opposed wedge-shaped ends, said carriers being movable longitudinally relatively to said casing; a group of longitudinally disposed spring plates mounted on each carrier and adapted to be flexed upon approach of a carrier relative to its respective fulcrum bearing on the casing; wedge means, co-acting with said wedge-shaped ends of the carriers, arranged to separate the latter upon relative approach of said wedge means and effect relative longitudinal movement of said carriers and casings.

5. In a friction shock absorbing mechanism, the combination with a casing having interior laterally opposed convex fulcrum bearing surfaces; of a pair of longitudinally extending parallelly arranged carriers within said casing, said carriers being movable within said casing in the direction of the curvature of said convex surfaces, said carriers having oppositely extending wedge-shaped ends; a group of spring plates mounted on each carrier, movable therewith and adapted to be flexed upon said convex bearing surfaces; and wedge means relatively movable toward and from each other arranged to co-act with said wedge-shaped ends of the carriers to separate the latter and effect movement thereof and of said plates relatively to said convex bearing surfaces.

6. In a friction shock absorbing mechanism, the combination with a pair of longitudinally alined casings; of a pair of laterally opposed carriers within each casing; a group of spring plates mounted on each carrier; means providing fulcrum bearings for said groups of spring plates; and wedge means co-acting with said carriers arranged to move the same relatively transversely of the casings upon relative approach of said wedge means, said pairs of carriers being adapted to abut each other, and to abut the ends of the respective casings at the end of the compression stroke.

7. In a friction shock absorbing mechanism, the combination with two longitudinally alined hollow rectangular casings each provided with opposed fulcrum bearing surfaces on their inner sides; of four carriers, two within each casing arranged in pairs transversely; spring plates mounted on each of the carriers and adapted to be flexed on said fulcrum bearing surfaces; centrally located wedge means cooperable with the adjacent corners of the four carriers; and wedge means at each outer set of ends of the carriers cooperable therewith.

8. In a friction shock absorbing mechanism, the combination with two longitudinally alined hollow rectangular casings each provided with opposed fulcrum bearing surfaces on their inner sides; of four carriers, two within each casing, arranged in pairs transversely; spring plates mounted on each of the carriers and adapted to be flexed on said fulcrum bearing surfaces; centrally located wedge means cooperable with the adjacent corners of the four carriers; and wedge means at each outer set of ends of the carriers cooperable therewith, said casings being arranged to abut each other at the end of a compression stroke and each pair of longitudinally alined carriers being adapted to abut each other and to abut the ends of the respective casings at the end of the compression stroke.

In witness that I claim the foregoing I have hereunto subscribed my name this 25th day of Sept., 1922.

JOHN F. O'CONNOR.